United States Patent
Stark et al.

(10) Patent No.: US 12,503,309 B2
(45) Date of Patent: Dec. 23, 2025

(54) SYSTEM AND METHOD FOR DELIVERING PACKAGES

(71) Applicant: Ford Global Technologies, LLC, Dearborn, MI (US)

(72) Inventors: Steven Stark, Northville, MI (US); Girish Kumar Yadav, Dearborn, MI (US); Timothy Mark Feldkamp, Ann Arbor, MI (US); Kurt Michael Lundeen, Novi, MI (US); David Melcher, Ypsilanti, MI (US); John Randolf Vincent, Livonia, MI (US); Yifan Chen, Ann Arbor, MI (US); Sarah Garrow, Marshall, MI (US)

( * ) Notice: Subject to any disclaimer, the term of this patent is extended or adjusted under 35 U.S.C. 154(b) by 782 days.

(21) Appl. No.: 17/929,348

(22) Filed: Sep. 2, 2022

(65) Prior Publication Data
US 2024/0076129 A1    Mar. 7, 2024

(51) Int. Cl.
  *B65G 1/137* (2006.01)
  *B65G 1/04* (2006.01)
(52) U.S. Cl.
  CPC ........ *B65G 1/1371* (2013.01); *B65G 1/0478* (2013.01)
(58) Field of Classification Search
  CPC .. B65G 1/1371; B65G 1/0478; G06Q 10/083; G06Q 10/08355; G06Q 10/08; B60P 3/007; B60P 3/00
  See application file for complete search history.

(56) References Cited

U.S. PATENT DOCUMENTS

| | | | |
|---|---|---|---|
| 9,950,862 B2 | 4/2018 | Kadaba et al. | |
| 10,139,495 B2 | 11/2018 | Payne | |
| 12,103,796 B2 * | 10/2024 | Felton | B65G 67/24 |

(Continued)

FOREIGN PATENT DOCUMENTS

| | | | |
|---|---|---|---|
| AU | 2018100216 A4 * | 3/2018 | |
| CN | 210402555 U * | 4/2020 | |

(Continued)

OTHER PUBLICATIONS

Alex Davis, This Startup Wants to Remake the Last Mile of Parcel Delivery, Wired, Jun. 6, 2019, 1-6.

*Primary Examiner* — Jacob S. Scott
*Assistant Examiner* — Erin Morris
(74) *Attorney, Agent, or Firm* — Emily Drake; Eversheds Sutherland (US) LLP (57) ABSTRACT

A method for delivering a plurality of packages is described. The method includes obtaining, via a processor, information associated with a delivery plan of the plurality of packages from at least one memory. Based on the information, the method includes determining, via the processor, a current location, and a destination location of a target container. In response to the determination, the method includes determining, via the processor, a movement plan to move the target container to the destination location. Based on the movement plan, the method includes activating, via the processor, a first set of motorized tiles to move the target container to the destination location. The method further includes receiving, via the processor, an updated movement plan from a server plan when a preset condition is met. Based on the updated movement plan, the method includes activating, via the processor, a second set of motorized tiles.

18 Claims, 7 Drawing Sheets

(56) References Cited

U.S. PATENT DOCUMENTS

| | | | |
|---|---|---|---|
| 2012/0177467 A1* | 7/2012 | Corrigan | B60P 1/6427 |
| | | | 414/352 |
| 2018/0170675 A1* | 6/2018 | High | B60P 1/6481 |
| 2020/0385207 A1* | 12/2020 | Godwin | B60P 3/007 |
| 2021/0024292 A1* | 1/2021 | Salter | B65G 21/10 |
| 2021/0179352 A1 | 6/2021 | Haid | |
| 2021/0256472 A1* | 8/2021 | Javidan | H04W 4/025 |
| 2021/0387808 A1* | 12/2021 | Kalouche | B60P 3/007 |

FOREIGN PATENT DOCUMENTS

| | | | | |
|---|---|---|---|---|
| CN | 111923811 A * | 11/2020 | | B60P 7/13 |
| DE | 4204713 C2 * | 2/1996 | | E04H 6/282 |
| GB | 2551909 A * | 1/2018 | | G07F 17/13 |
| JP | H09512601 * | 12/1997 | | |
| JP | H10184138 * | 7/1998 | | |
| JP | 2019001382 A * | 1/2019 | | |
| JP | 2020062980 A | 4/2020 | | |
| JP | 2022043771 A * | 3/2022 | | |
| WO | WO-2019090196 A1 * | 5/2019 | | G06Q 10/087 |
| WO | WO-2020104568 A1 * | 5/2020 | | G06Q 10/083 |

\* cited by examiner

SYSTEM AND METHOD FOR DELIVERING PACKAGES

TECHNICAL FIELD

The present disclosure relates to a system and method for delivering packages, and more particularly, to automated sorting of packages in a delivery vehicle during the unloading of the packages.

BACKGROUND

With the continued growth of internet-based commerce, package delivery is increasingly used to deliver goods to customers. Specifically in the US, e-commerce business is expected to continue to grow in the years to come.

Unprecedented growth is received favorably by e-commerce companies; however the rapid growth also leads to operational challenges in the supply chain. E-commerce companies and their delivery partners deliver an ever-increasing number of packages per day, while reducing resource expenditure (e.g., delivery time, labor, fuel consumption, etc.).

Various approaches currently used to optimize delivery volume and standard delivery time of packages include the use of smart routing and smart vehicle allocation. For example, some conventional delivery partners may aggregate delivery of packages with unrelated shipments having similar destination addresses (for example, addresses in the same neighborhood). In other aspects, conventional systems may use a single delivery vehicle to deliver these packages.

Another conventional approach includes sorting and loading of the packages into the delivery vehicle in a preset order, based on the delivery route, to improve the efficiency of package delivery.

Although the conventional approaches mentioned above may create delivery efficiencies, they are unable to mitigate all the delivery related challenges faced by e-commerce companies and delivery partners. For example, the unloading of the packages from the delivery vehicle for the last mile delivery is still a manual and time-consuming process. Even if the packages are loaded into the delivery vehicle in a preset order, unloading can take a lot of time, especially if the delivery vehicle is large and carries many packages.

Thus, there still exists a need in the industry for an improved system and method for delivering packages, specifically for minimizing the amount to time and effort required for unloading the packages from a delivery vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a delivery vehicle system configured and/or programmed for package delivery by causing package handling mechanism(s) to organize and position packages proximate to a vehicle exit point of offloading access as the delivery vehicle proceeds along a delivery route. The system may position and reposition the packages in the delivery vehicle based on delivery order. When the system experiences a blockage that prevents organization of a package from a first position to a second position, the system may determine an intra-vehicle package route that repositions a target package using a minimized number of package handling moves. The disclosed system and process may minimize vehicle energy consumption and handling time while delivery vehicles complete package delivery routes.

In one aspect, the delivery vehicle may include a grid of plurality of motorized tiles on which containers or bins are positioned that hold and organize the packages to be delivered on the route. In one aspect, one container may contain one or more packages (depending on the size and weight of packages), and one container may be placed over one motorized tile.

In some aspects, the delivery vehicle may include an on-board computer. The on-board computer may include a memory that may store a delivery plan for each of the packages, and their current delivery status. The memory may further store information related to a mapping of the containers with the corresponding packages, a mapping of the containers with the corresponding motorized tiles, and current locations of each of the motorized tiles on the grid.

In an embodiment, the on-board computer may include a processor that may determine a target package which is next in the delivery schedule. In one aspect, the processor may determine the target package based on the obtained information from the memory of the on-board computer.

On determination of the target package, the processor may determine a target container that contains the target package and determine a present location for a target motorized tile/target container. The processor may implement a movement plan that includes instructions causing activation of a first set of motorized tiles of the plurality of motorized tiles to move the target motorized tile from its current location to a destination location. The destination location may be, for example, a motorized tile that is near the exit of the delivery vehicle, so that an operator of the delivery vehicle (or drone) can easily pick the target package.

In an embodiment, the onboard computer includes a memory storing a movement plan that, when executed, causes the system to move the target motorized tile from its current location to the destination location.

In another embodiment, the processor may determine that the system has experienced a fault that prevents one or more motorized tiles of the first set of motorized tiles from full functionality that allow use of the respective tile to route cargo through a particular location. In some aspects, the processor may detect a fault, generate an updated movement plan request, and forward the request to a server via a wireless data connection. Responsive to the request, the system may receive the updated movement plan from the server. The updated movement plan may include instructions that cause the system to activate a second set of motorized tiles of the plurality of motorized tiles. The updated movement plan may include movement patterns, which when implemented by the processor, causes movement of the target motorized tile from its current location to the destination location without the involvement of the motorized tile(s) associated with the fault condition.

ILLUSTRATIVE EMBODIMENTS

The disclosure will be described more fully hereinafter with reference to the accompanying drawings, in which example embodiments of the disclosure are shown, and not intended to be limiting.

Figure 1:
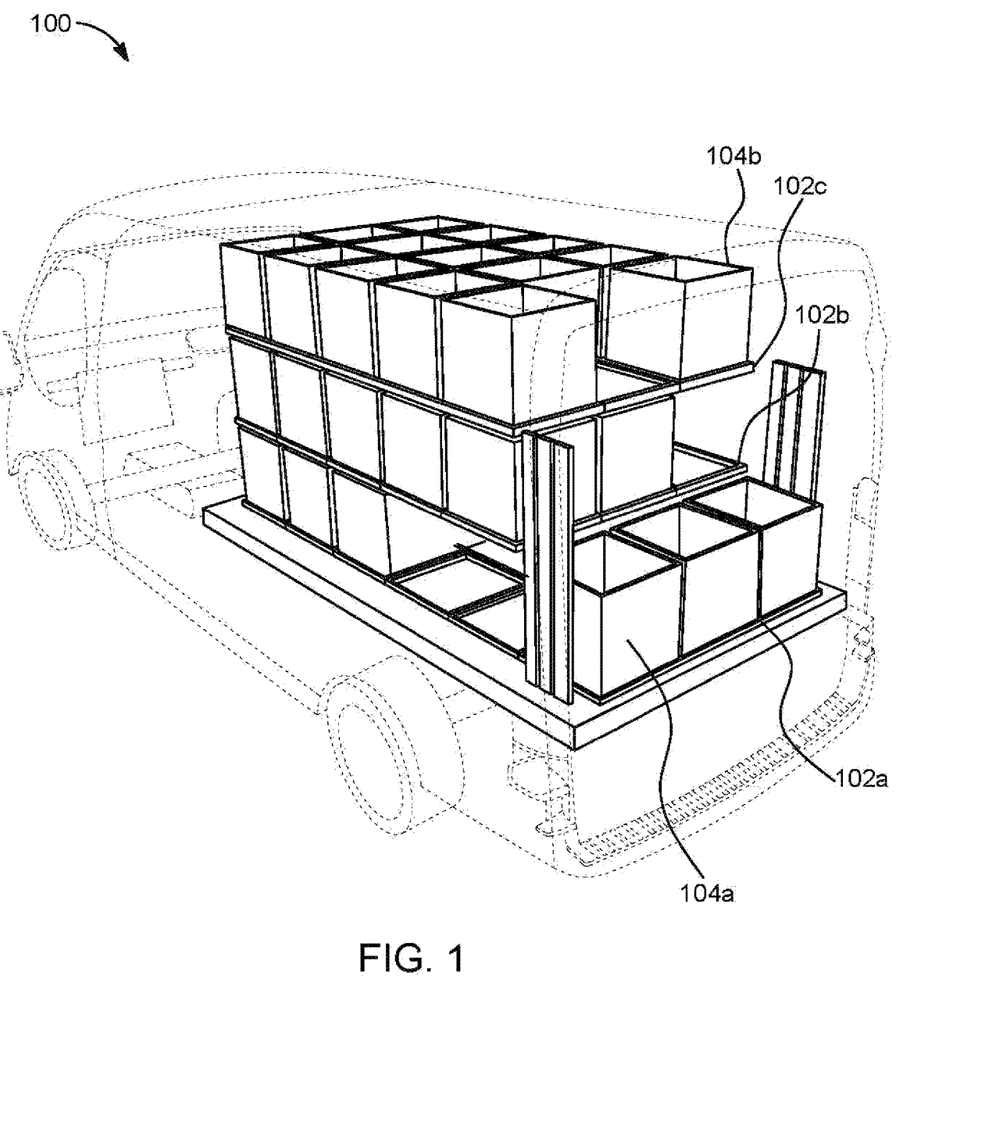
FIG. 1 depicts an example delivery vehicle in which techniques and structures for providing the systems and methods disclosed herein may be implemented.

FIG. 1 depicts an example delivery vehicle 100 in which techniques and structures for providing the systems and methods disclosed herein may be implemented. The delivery vehicle 100 may include, but not limited to, a truck, a van (including walk-in vans), a truck trailer, and/or the like. In some aspects, the delivery vehicle 100 may be an autonomous vehicle. In other aspects, a driver/operator may operate the delivery vehicle 100.

In an embodiment, the delivery vehicle 100 may include a plurality of motorized tiles 102a, 102b, 102c (collectively referred to as a plurality of motorized tiles 102). The plurality of motorized tiles 102 may be positioned in a grid or a stack of grids (one over another) forming an array of planar and/or stacked rows and columns. In some aspects, the grid (or array) size and the number of stacks may be changeable based on size and/or vehicle type of the delivery vehicle 100. For instance, the delivery vehicle 100 may include three grids (or beds) stacked one over the other, each having 18 motorized tiles (a grid of 3 rows and 6 columns). In some aspects, the shape of each of the plurality of motorized tiles 102 may be square, rectangular, or take another shape making full use of vehicle cargo bay area(s). The details of the plurality of motorized tiles 102 may be understood in conjunction with FIG. 2.

In some aspects, the delivery vehicle 100 may include a plurality of containers (or bins) 104a, 104b (collectively referred to as a plurality of containers 104), placed over the plurality of motorized tiles 102. Each of the plurality of containers 104 may take any shape or configuration such as, for example, a square or a rectangular box disposed to hold packages (packages not shown in FIG. 1) that the delivery vehicle 100 delivers to final destinations along a delivery route.

The plurality of containers 104 may be loaded onto the plurality of motorized tiles 102 (and hence, onto the delivery vehicle 100) in a preset order, as per the delivery sequence of the packages contained in each of the plurality of containers 104. Specifically, the plurality of containers 104 may be loaded based on the delivery schedule of each of the packages, to avoid unnecessary re-arrangement during transit. For instance, the packages that are to be delivered first are placed near the exit point of the delivery vehicle 100, and the packages that are to be delivered at the last are placed far from the exit point.

Similarly, the packages may also be loaded in the plurality of containers 104 based on the delivery schedule of the packages. In addition, the packages may be loaded in a plurality of containers 204 based on the package size, dimension, shape, and weight, to optimize the usage of the plurality of containers 104.

In accordance with one or more aspects of the present disclosure, the plurality of motorized tiles 102 may be configured to automatically move, position, and/or reposition the plurality of containers 104 in the cargo hold of the delivery vehicle 100. The plurality of containers 104 moves in the delivery vehicle 100, based on the delivery schedule of the packages present therein. In other words, the plurality of motorized tiles 102 may be configurable to automatically sort the plurality of containers 104, by moving a target container (storing within it a package to be delivered at a next delivery location) to an exit point (not shown in FIG. 1) of the delivery vehicle 100. This automatic movement of the target container to the exit point may assist a delivery vehicle operator (operator not shown in FIG. 1) or a delivery robot (delivery robot not shown in FIG. 1) to unload the package(s) from the target container at the vehicle exit point, with minimal manual effort and with minimal or no repositioning of packages for access to the target package. The same arrangement is helpful in preserving resources when the delivery vehicle 100 is an autonomous vehicle and drones deliver the packages.

The details of the movement of the plurality of containers 104 within the delivery vehicle 100 may be understood in conjunction with subsequent figures.

Figure 2:
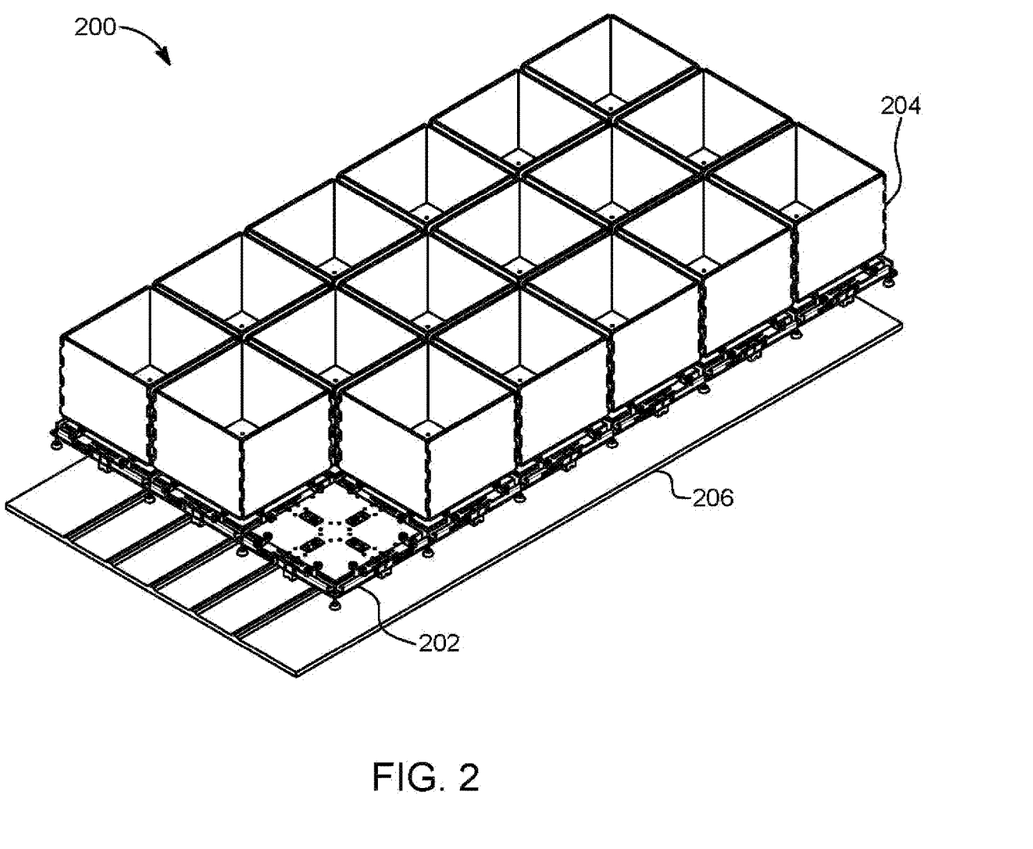
FIG. 2 illustrates an example inventory management system in the delivery vehicle in accordance with the present disclosure.

FIG. 2 illustrates an example inventory management system 200 associated with the delivery vehicle 100, in accordance with the present disclosure. FIG. 2 illustrates a bed/grid of motorized tiles 202, and the plurality of containers 204 that are disposed proximate to and/or positioned on the grid of motorized tiles 202. As discussed above, the grid of motorized tiles 202 may be configured to move and/or reposition the plurality of containers 204 throughout the delivery vehicle 100.

In some aspects, the grid of motorized tiles 202 may include a plurality of rollers that may be coupled with one or more actuators (not shown in FIG. 2). The actuators may actuate a part, or all of the plurality of rollers based on the delivery schedule of the packages. For instance, if a package 208 is to be delivered at the next delivery station, then the actuators may only actuate rollers that cause to move or assist in moving the container containing the package 208 from its current location 210 to an exit point (or destination location) 212 of the grid of motorized tiles 202. The exit point 212 may be, for example, the point on the grid from where an operator (not shown in FIG. 2) of the delivery vehicle 100 can easily pick the package 208, with minimal manual effort.

In some aspects, the actuators may be and/or include a servomotor or other actuator that receives an actuation signal from an on-board computer (not shown in FIG. 2) of the delivery vehicle 100. In particular, the on-board computer may provide a first actuation signal (i.e. supply a voltage at a first polarity) to a first actuator(s) to make roller(s), coupled to the actuator, rotate in a first/clockwise direction. Similarly, the on-board computer may provide a second actuation signal (i.e. supply the voltage at a second polarity) to a second actuator(s) to make roller(s), connected to the second actuator(s), rotate in second/anticlockwise direction. In other words, by changing the polarity of the supplied voltage, the on-board computer may enable movement of a roller in either a clockwise or an anticlockwise direction. This helps the on-board computer to control the movement of the rollers (and hence the containers placed over them) within the delivery vehicle 100.

For instance, the on-board computer may send a signal to one or more actuators to move a specific container (such as the container containing the package 208) from its current location 210 to the destination location 212 within the grid. Based on the received signal, the one or more actuators may move their respective rollers to enable the movement of the specific container from the current location 210 to the destination location 212.

In another aspect the grid of motorized tiles 202 may be mounted on a base 206. In some aspects, the base 206 may be constructed of metal such as iron, steel, aluminum, or a combination thereof, and may couple to the one or more actuators such that the actuators can provide package and bin repositioning in two or three axes.

Figure 3:
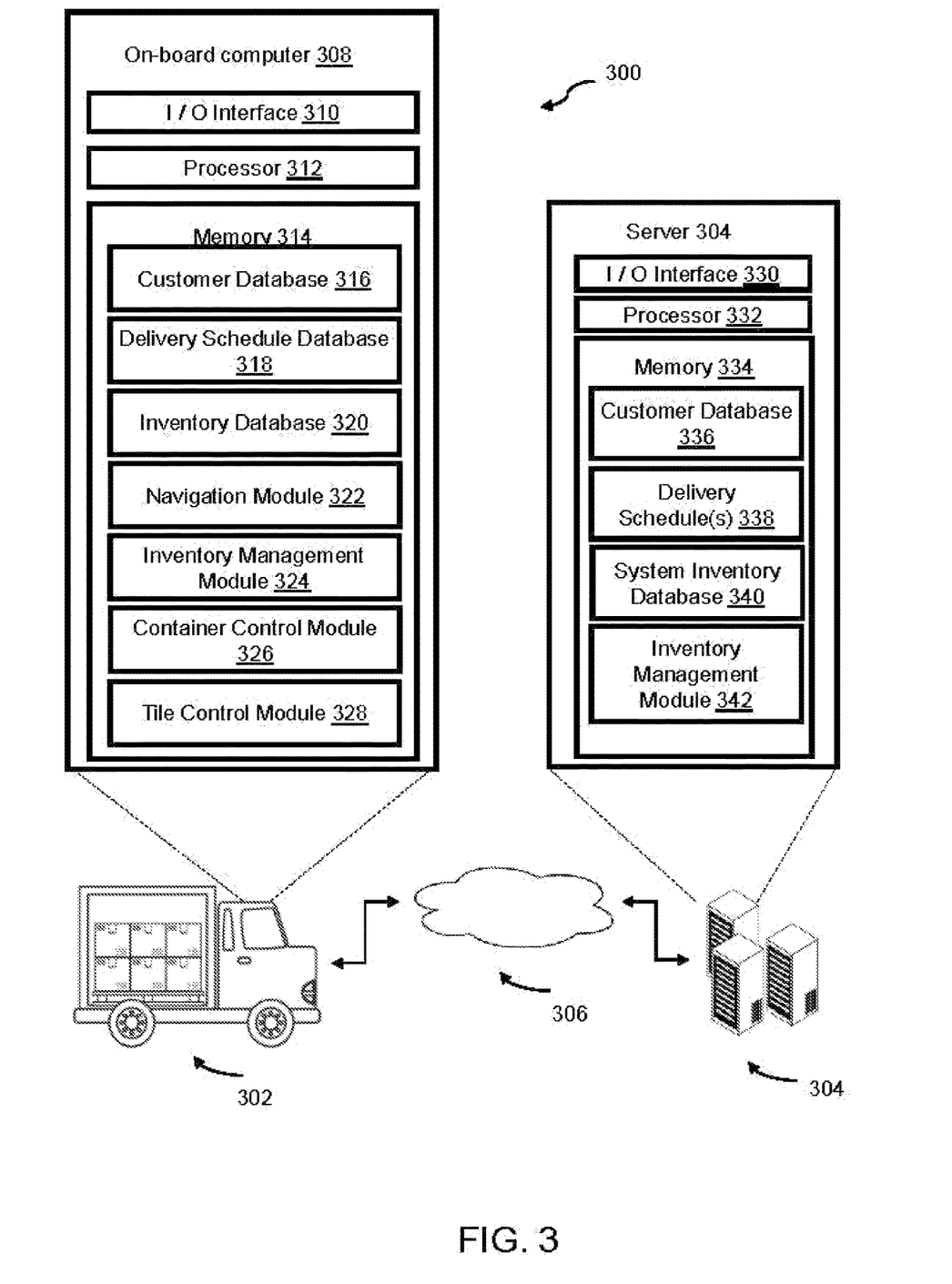
FIG. 3 illustrates a block diagram of an example delivery management system for delivering the packages in accordance with the present disclosure.

FIG. 3 illustrates a block diagram of an example delivery management system 300 for delivering packages, in accordance with the present disclosure. The delivery management system 300, as described herein, can be implemented in hardware, software (e.g., firmware), or a combination thereof. The block diagram includes a delivery vehicle 302 and one or more servers 304 (or server 304), which are communicatively coupled to each other via one or more networks 306 (or network 306). In one aspect, an operator may operate the delivery vehicle 302. In another aspect, the delivery vehicle 302 may be an autonomous vehicle.

The network 306 may be, for example, a communication infrastructure in which the connected devices discussed in various embodiments of this disclosure may communicate. The network 306 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In accordance with an embodiment, the delivery vehicle 302 may include an on-board computer 308, which may be configured to communicate with the server 304 via the network 306. The server 304 may be part of a cloud-based computing infrastructure and may be associated with and/or include a Telematics Service Delivery Network (SDN) that provides digital data services to the delivery vehicle 302 and other vehicles (not shown in FIG. 3), that may be part of a vehicle fleet.

In accordance with an embodiment, the on-board computer 308 may include a plurality of components including, but not limited to, an Input/Output (I/O) interface 310, a processor 312, and a memory 314, which are communicatively coupled to each other. The memory 314 may store programs in code and/or store data for performing various operations of the on-board computer 308 in accordance with the present disclosure. Specifically, the processor 312 may be configured and/or programmed to execute computer-executable instructions stored in the memory 314 for performing various functions of the on-board computer 308 in accordance with the disclosure. Consequently, the memory 314 may be used for storing code and/or data code and/or data for performing operations in accordance with the present disclosure.

In one or more embodiments, the processor 312 may be disposed in communication with one or more memory devices (e.g., the memory 314 and/or one or more external databases (not shown in FIG. 3)). The memory 314 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 314 may be one example of a non-transitory computer-readable medium and may be used to store programs in code and/or to store data for performing various operations in accordance with the disclosure. The instructions in the memory 314 can include one or more separate programs, each of which can include an ordered listing of computer-executable instructions for implementing logical functions.

In accordance with an embodiment, the memory 314 may store a plurality of information/dataset in one or more databases. Examples of such databases include, but are not limited to, a customer database 316, and a delivery schedule database 318, and an inventory database 320. In addition, the memory 314 may include one or more modules to facilitate operation of the on-board computer 308. Examples of such modules include, but are not limited to, a navigation module 322, an inventory management module 324, a container control module 326, and a tile control module 328.

In an embodiment, the I/O interface 310 of the on-board computer 308 may be configured to receive a plurality of customer information associated with the packages to be delivered by the delivery vehicle 302. For example, the customer information may include, for each of the delivery package, a name of the customer, a delivery address of the customer, any special instructions from the customer, and/or the like. In one aspect, the I/O interface 310 receives the plurality of customer information from an external database/server, which pre-stores such information for all the customers and the corresponding packages. For example, the I/O interface 310 may receive the plurality of customer information from the server 304, before the delivery vehicle 302 commences its delivery schedule.

In accordance with an embodiment, the customer database 316 may store the received plurality of customer information when the I/O interface 310 receives it.

The I/O interface 310 may be further configured to receive delivery schedule of the packages to be delivered via the delivery vehicle 302. The delivery schedule may include, but is not limited to, a sequence of the delivery of the packages presents in the delivery vehicle 302, and a date and time for the delivery, and/or the like. Like the plurality of customer information, the I/O interface 310 may receive the delivery schedule from an external database/server 304.

In an embodiment, the delivery schedule database 318 may store the received delivery schedule, when the I/O interface 310 receives it.

The I/O interface 310 may be further configured to receive a plurality of information associated with an inventory loaded in the delivery vehicle 302. The information associated with the inventory may include, for example, for each of the package, package size/dimension, package weight, and packet shape. The information may further include size of the containers (e.g. the plurality of containers 204) in which the packages are placed, and a mapping of the plurality of packages and the plurality of containers 204 (e.g., which package is placed in which container). Furthermore, the information may include, and an initial mapping of the plurality of containers 204 and the plurality of motorized tiles 202 (e.g., location of each of the containers 204 on the plurality of motorized tiles 202 at the time of loading). Like the earlier embodiments, the I/O interface 310 may receive the plurality of information associated with the inventory from an external database (e.g., the server 304).

In an embodiment, the inventory database 320 may store the inventory information when the I/O interface 310 receives it.

In accordance with further embodiment, the inventory database 320 may update the information stored therein, as and when the delivery vehicle 302 delivers the packages and/or the plurality of containers 204 (containing the packages) move on the plurality of motorized tiles 202. In other words, the inventory database 320 stores the current delivery status of each package of the plurality of packages, and the current location of each container of the plurality of containers 204.

In accordance with an embodiment, the I/O interface 310 may be further configured to receive a delivery route to deliver the packages loaded in the delivery vehicle 302.

In some aspects, an external database/the server 304 may send the delivery route to the I/O interface 310. In an embodiment, the external database/server 304 may use the delivery schedule of the packages and the customer addresses to determine the delivery route. The delivery route may be, for example, a shortest route to deliver all the packages in the delivery vehicle 302, or a route with minimum travel time.

In some aspects, the navigation module 322 of the on-board computer 308 may store the delivery route when the I/O interface 310 receives it.

In accordance with an embodiment, when the operator of the delivery vehicle 302 triggers or initiates the on-board computer 308 (e.g., when the operator starts the delivery schedule of the packages), the processor 312 may send a command to the navigation module 322 to generate turn-by-turn navigation for the sequence of delivery locations in the delivery route. In some aspects, a display screen of the on-board computer 308 may display the delivery route, and may be augment it with audio alerts.

In accordance with an embodiment, during transit of the delivery vehicle 302, the processor 312 may command the delivery schedule database 318 to determine which package (for example, a target package), of the plurality of packages, is scheduled for delivery at the next delivery location in the delivery route. The processor 312 may then command the inventory management module 324 to identify a container (for example, a target container) that contains the target package, and the current and destination location of the target container on the plurality of motorized tiles 202.

In some aspects, the inventory management module 324 may fetch the mapping of the packages to the containers from the inventory database 320 to identify the target container. In addition, the inventory management module 324 may fetch the current location of the target container from the inventory database 320. Furthermore, the inventory management module 324 may identify the destination location of the target container to where the target container needs to move. The destination location may be, for example, near an exit door or a pick-up door of the delivery vehicle 302, from where the operator of the delivery vehicle 302 can easily pick the target package.

In an embodiment, when the target container, its current location, and the destination location are identified, the processor 312 may fetch a movement plan (for example, pre-calculated steps), to move the target container from its current to the destination location, that is pre-stored in the container control module 326 of the memory 314. Specifically, before the delivery vehicle 302 begins its transit, the external database/server 304 may send a movement plan to the container control module 326 for each tile of the plurality of motorized tiles 202 (containing the plurality of containers 304), to enable delivery of packages in the delivery route. The movement plan may include sequence of steps to activate some or all the plurality of motorized tiles 202 to move the target container to the destination location, as per the delivery schedule.

In an embodiment, the movement plan may be pre-calculated based on the shortest path between the current location of the target container and its destination location. In some aspects, the movement plan may be based on the least number of moves of the motorized tiles, required to move the target container from its current location to the destination location. The details of the movement plan may be understood in conjunction with FIGS. 4-6.

Based on the received movement plan, the processor 312 may send an actuation signal to one or more actuators associated with a first set of motorized tiles of the plurality of motorized tiles 202. The first set of motorized tiles may include the tiles that enable the movement of the target container from its current location to the destination location.

When the target container moves to the destination location, the operator of the delivery vehicle 302 (or drone) may pick the corresponding target package from the target container for last mile delivery.

In an embodiment, when the target container moves from its current location to the destination location, the inventory management module 324 may track the movement, and send the latest locations of all the plurality of containers 204 to the inventory database 320. In this manner, the inventory database 320 has latest (i.e. current) location information of all the containers. Similarly, the inventory management module 324 may track the packages that are delivered and send the updated delivery status of each package to the inventory database 320. This way, the inventory database 320 has current delivery status of all the packages.

The description of the on-board computer 308 and its components provided above explains the embodiments of the present disclosure when all the tiles of the plurality of motorized tiles 202 function properly.

In accordance with an embodiment of the present disclosure, when one or more motorized tiles of the plurality of motorized tiles 202 develop a fault (e.g., cease to function), the tile control module 328 may send a notification to the processor 312. Specifically, the tile control module 328 may determine working status of each tile of the plurality of motorized tiles 202 at a predefined frequency (e.g., every 15 seconds), and send a notification to the processor 312 if one of the tiles develops a fault. In some aspects, the tile control module 328 may also receive a fault notification for a particular tile or a set of tiles from the I/O interface 310. In this case, the operator of the delivery vehicle 302 may input a notification on the I/O interface 310, when he notices a faulty tile (e.g., a tile which is not moving), or when he hears a faulty noise from one of the tiles. The I/O interface 310 may then send the received notification to the tile control module 328.

In accordance with an embodiment, the notification sent by the tile control module 328 to the processor 312 includes a location of the faulty tile, on the plurality of motorized tiles 202, in the delivery vehicle 302.

On receipt of the notification from the tile control module 328, the processor 312 may send a request to the server 304 to update the movement plan. Specifically, the processor 312 may send the request to the server 304 via the I/O interface 310. In accordance with an embodiment, the request may include the location of the faulty tile on the plurality of motorized tiles 202, and a current delivery status for each of the packages in the delivery vehicle 302. For the latter information, the processor 312 may send a command to the inventory management module 324 to fetch the current delivery status of packages, and then share the request with the server 304.

In response to the receipt of the request, the server 304 may determine an updated movement plan, and transmit the updated movement plan to the I/O interface 310. The updated movement plan may include updated sequence (movement pattern) for the movement of the rollers/motorized tiles to move the target container from its location to the destination location, without the involvement or need for the movement of the faulty tile.

In response to receiving the updated movement plan, the I/O interface 310 may send the updated plan to the container control module 326 for storage. The container controller module 326 may then send the updated movement plan to the processor 312. On receipt of the updated movement plan, the processor 310 may activate a second set of motorized tiles to move the target container from its current location to the destination location. The details of the updated movement plan may be understood in conjunction with subsequent drawings.

From the description above, it would be apparent to a person ordinarily skilled in the art that the server 304 updates the movement plan when one or more tiles develop a fault. In other words, under normal functioning of all the tiles, the pre-calculated movement plan that is stored on the on-board computer 308 of the delivery vehicle 302 is used and implemented, and a connection with the server 304 may not be required during the transit of the delivery vehicle 302. This way, additional computation resources of the on-board computer 308 and the server 304 are saved and are only used when a tile ceases to function.

In accordance with an embodiment of the present disclosure, the server 304 may include a plurality of components including, but not limited to, an Input/Output (I/O) interface 330, a processor 332, and a memory 334, which are communicatively coupled to each other.

The memory 334 may store programs in code and/or store data for performing various operations of the server 304 in accordance with the present disclosure. Specifically, the processor 332 may be configured and/or programmed to execute computer-executable instructions stored in the memory 334 for performing various functions of the server 304 in accordance with the present disclosure. Consequently, the memory 334 may be used for storing code and/or data code and/or data for performing operations in accordance with the present disclosure.

In one or more embodiments, the processor 332 may be disposed in communication with one or more memory devices (e.g., the memory 334 and/or one or more external databases (not shown in FIG. 3)). The memory 334 may be like the memory 314.

In accordance with an embodiment, the memory 334 may store a plurality of information/dataset in one or more databases. Examples of such databases include, but are not limited to, a customer database 336, one or more delivery schedule database(s) 338, a system inventory database 340, and an inventory management module 342.

In accordance with an embodiment, the I/O interface 330 may receive the plurality of customer information from the customers when they place orders for packages. Specifically, the server 304 may be associated with an e-commerce platform, and the customers of the platform may place the respective orders using the server 304. In another embodiment, the server 304 may be associated with a delivery partner of the e-commerce platform, and the I/O interface 330 may receive the customer information directly from the e-commerce platform.

In some aspects, the customer database 336 may store the customer information, when the I/O interface 330 receives it. The details of the customer information are already described above.

In accordance with an embodiment, the I/O interface 330 may further receive delivery schedules of packages via a plurality of delivery vehicles. The delivery schedule may include allocation of the plurality of delivery vehicles to deliver ordered packages, a delivery route of each of the plurality of delivery vehicles, sequence of the delivery of the packages present in each of the delivery vehicles, date and time for the delivery of the packages, and/or the like.

In some aspects, a delivery schedule database 338 may store the delivery schedule, when the I/O interface 330 receives it.

In accordance with an embodiment, the I/O interface 330 may further receive a plurality of information associated with the inventory (e.g. mapping of containers and packages, and mapping of containers and tiles) loaded in each of the delivery vehicles. The details of the information associated with the inventory are already discussed above.

The system inventory database 340 may store the information associated with inventory, when the I/O interface 330 receives it.

In accordance with further embodiment of the present disclosure, the processor 332 may command the inventory management module 342 to fetch the information associated with the inventory loaded in each of the plurality of delivery vehicles from the system inventory database 340. In addition, the processor 332 may command the inventory management module 342 to fetch the delivery schedule and the customer information from the delivery schedule database 338 and the customer database 336, respectively.

Based on the fetched information, the processor 332 may generate a movement plan for each of the plurality of delivery vehicles, to move the packages (specifically, containers) within each vehicle from the current locations to the destination locations, based on the respective delivery schedules. As and when the processor 332 creates a movement plan for a delivery vehicle, the inventory management module 342 may be store the plan, and the I/O interface 330 may send the plan to the corresponding delivery vehicle. In an embodiment, the I/O interface 330 may also send the corresponding customer information, delivery schedule information and the inventory information, to the delivery vehicle for storage.

When any motorized tile develops a fault/ceases to function in a delivery vehicle, the I/O interface 330 is configured to receive a request from the delivery vehicle (from the on-board computer associated with the delivery vehicle) to provide an updated movement plan. The request may include the status (e.g. operational status) of the motorized tiles of the delivery vehicle, the location of the faulty tile within the delivery vehicle, the current delivery status of the packages present in the delivery vehicle 302, and/or the like.

In accordance with an embodiment, the memory 334 may store the details of the received request when the I/O interface 330 receives it. Furthermore, the processor 332 may obtain the details of the request from the memory 334, and prepare an updated movement plan. In accordance with an embodiment, the updated movement plan may include selection and activation of a different set of motorized tiles (different from the initial movement plan) to move the target container, such that the movement of the faulty tile(s) is not needed to move the target container to its destination location.

In some aspects, the processor 332 may be further configured to transmit, via the I/O interface 330, the updated movement plan (including movement pattern of the set of motorized tiles) to the delivery vehicle. The details of the updated movement plan may be understood in conjunction with subsequent figures.

Figure 4:
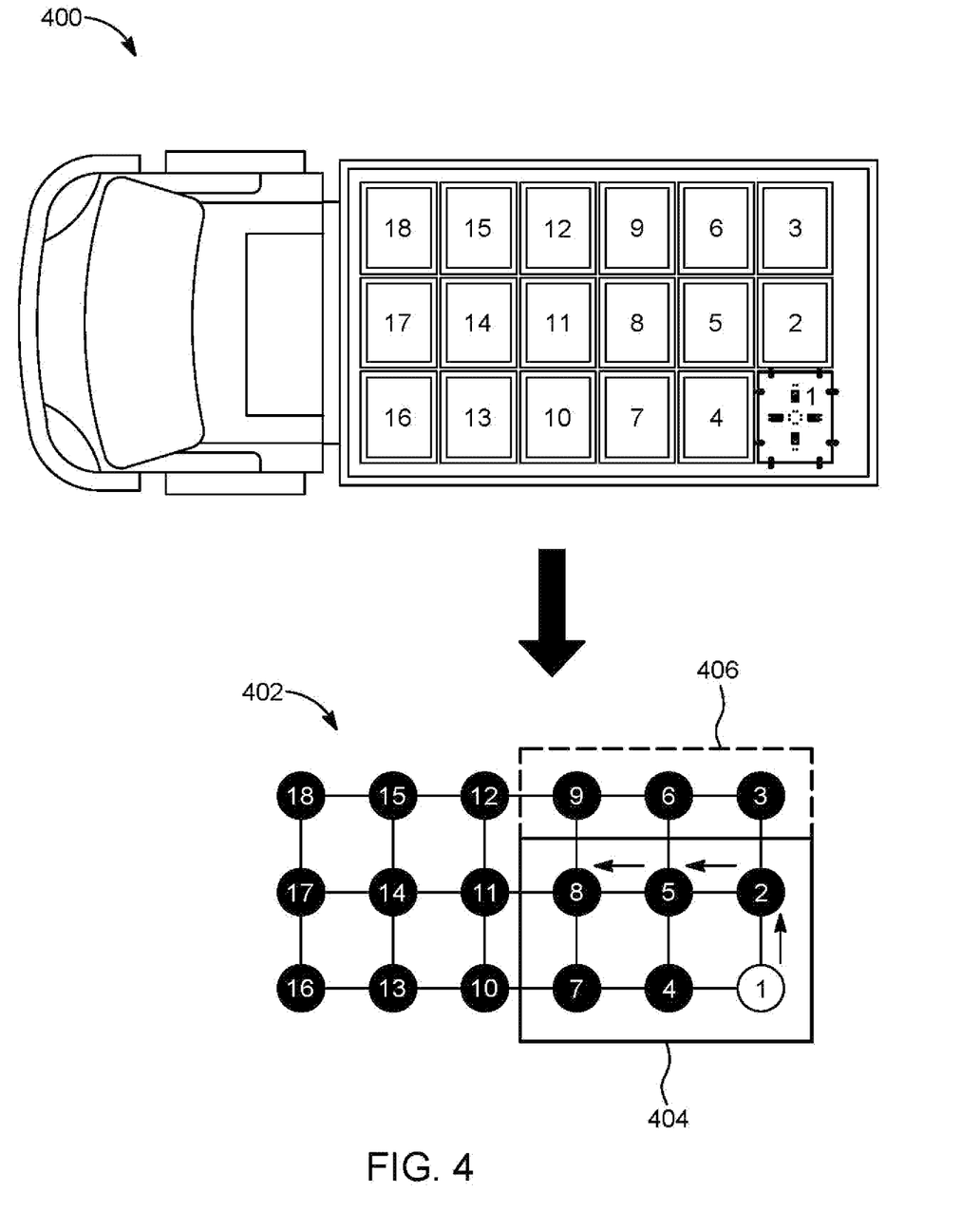
FIG. 4 depicts an example embodiment to move a container to a destination location in the delivery vehicle, in accordance with the present disclosure.

FIG. 4 depicts an example embodiment to move a target container in a delivery vehicle 400, in accordance with the present disclosure. In particular, FIG. 4 illustrates a top view of the delivery vehicle 400. The delivery vehicle 400 may include a grid of plurality of motorized tiles 1-18. As depicted in FIG. 4, tile 1 may be blank (i.e. no container is placed on tile 1) and tiles 2-18 may contain containers. A person ordinarily skilled in the art may appreciate that the delivery vehicle 400 may include additional motorized tiles, which are not visible in the top view of the delivery vehicle 400.

As discussed above, the containers may be loaded on the delivery vehicle 400 in a predetermined manner based on the delivery schedule of the packages contained therein. The containers to the destination location, the server 304 (via the processor 332) may generate a movement plan for each container. The movement plan may include sequence of steps to move each container to the destination location, based on the delivery schedule of the packages contained in the container. After generating the movement plan, the server 304 may transmit the movement plan to the on-board computer 308 of the delivery vehicle 400. The on-board computer 308 may be configured to receive the movement plan and store it in the memory 314 of the on-board computer 308. During transit, the on-board computer 308 may trigger the movement plan to move a container (e.g., a target container) to the destination location based on the delivery schedule. In other words, the pre-calculated movement plan is stored in the on-board computer 308 so that the on-board computer 308 may actuate the movement plan without communicating with the server 304 (e.g., the on-board computer 308 implements the movement plan in an offline mode).

In some aspects, to generate the movement plan, the server 304 may convert the grid of plurality of motorized tiles 1-18 into a graph 402 (e.g., a network of nodes representing the plurality of motorized tiles 1-18 using NetworkX Python graphing library). On creation of the graph 402, the server 304 may determine a shortest path using Dijkstra's algorithm from the blank tile 1 to a target tile (such as tile 8) having a target container/package (to-be delivered at next delivery station). In response to the determination of the shortest path, the server 304 may identify/select a smallest first loop 404 (a first subset of the network nodes) that includes a first set of motorized tiles. The first set of motorized tiles may include the blank tile 1, the target tile 8, a destination tile (at which the target package is to be moved, such as tile 1), and one or more other tiles. In other words, the first set of motorized tiles may comprise a blank tile, the target tile, the destination tile, and a set of other tiles (shown as tiles 2, 4, 5 and 7). The first loop 404 may be of any shape and size. In some aspects, the first loop 404 may be a 2*2 square. In other aspects, the first loop 404 may be rectangular, as shown in FIG. 4.

On the creation of the first loop, a movement plan is created such that the blank tile 1 moves along the first loop 404 to move the target tile 8 to the destination tile 1 (destination location).

As mentioned above, when the server 304 generates the movement plan, the server 304 may transmit the movement plan for each target container to the on-board computer 308 for storage. In some aspects, the server 304 may transmit the movement plan as JSON that may be read by the processor 312 of the on-board computer 308 of the delivery vehicle 302.

During the transit of the delivery vehicle 302, the processor 312 may implement the pre-calculated movement plans for each container, to move the containers within the delivery vehicle 302. For instance, the processor 312 may actuate the first set of motorized tiles to move the target container on the target tile 8 to the destination location (tile 1), when a package contained in the target container is up for delivery/pick up.

In accordance with an embodiment, when the processor 312 identifies any fault (i.e. such as identification of a frozen tile) in the first set of motorized tiles, then the processor 312 may transmit a request to the server 304 to update the movement plan.

In some aspects, the request may include a plurality of information, such as working status of the first set of motorized tiles, current delivery status of the packages contained in the containers, and/or the like. When the server 304 receives the request, the server 304 may generate an updated movement plan based on the received request. In particular, the server 304 may generate the updated movement plan having an updated sequence of steps to move the target container to the destination location. For instance, the server 304 may identify/select a second loop 406 (second subset of the network) having a second set of motorized tiles. The second set of motorized tiles may include the blank tile 1, the target tile 8, the destination tile 1, one or more of first set of motorized tiles, and one or more adjacent motorized tiles to the first set of motorized tiles.

In some aspects, the second loop 406 may be greater in length or width than the first loop 404, as shown in FIG. 4. In accordance with an embodiment, the server 304 may generate the second loop 406 by expanding the first loop 404, by adding one or more additional rows and/or columns. In accordance with an embodiment, the above-mentioned steps repeat until the target container reaches the destination location.

In response to the generation of the updated movement plan, the server 304 may transmit the updated movement plan to the on-board computer 308. The on-board computer 308 may then receive the updated movement plan and store it in the memory 314. In addition, the processor 312 may then implement the updated movement plan to move the target container to the destination location.

Figure 5A:
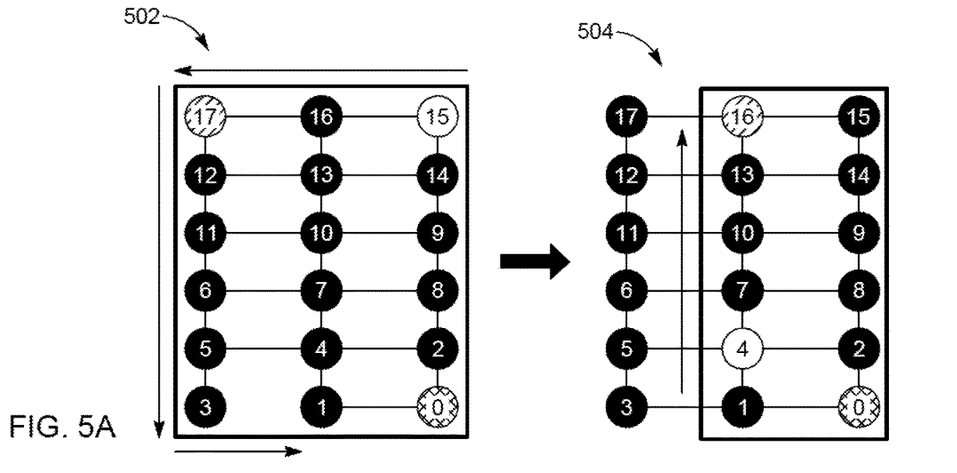
FIGS. 5A-5C illustrate a plurality of graphs illustrating package movements from a present or beginning position to a target destination, in accordance with the present disclosure.
Figure 5B:
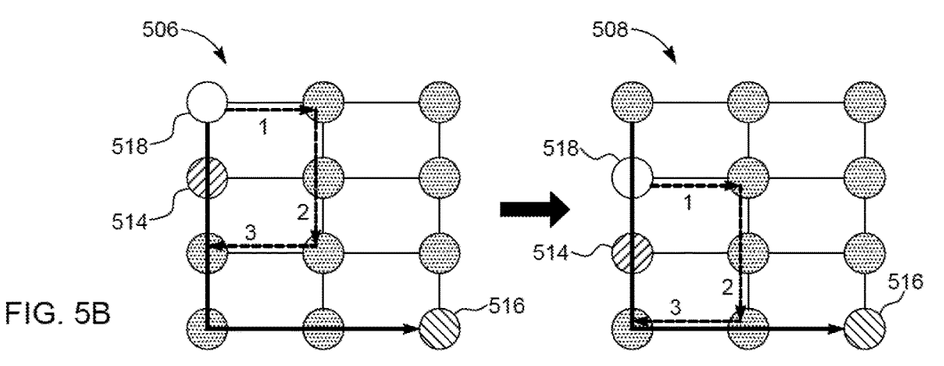
Figure 5C:
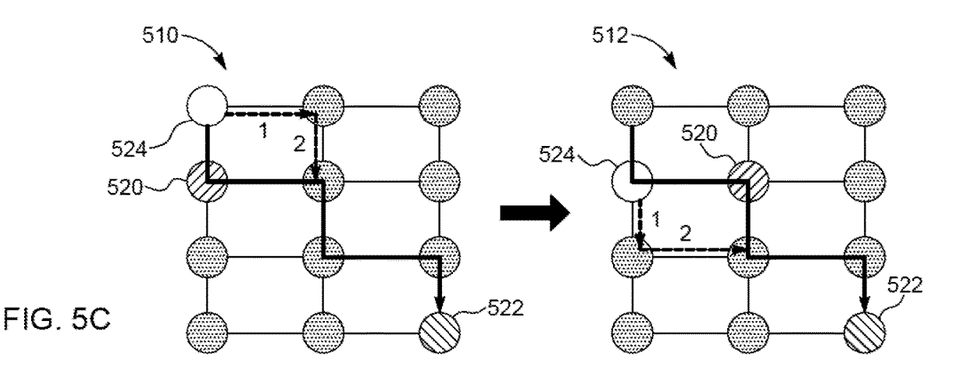

FIGS. 5A-5C illustrates a plurality of graphs illustrating package movements from a present or beginning position to a target destination. More particularly, FIGS. 5A-5B depicts a series of graphs 5(A), 5(B), and 5(C) that depict various embodiments to illustrate the system of FIGS. 1-4 moving a package from a present position to a target container position (e.g., target destination) in the delivery vehicle 400, in accordance with the present disclosure.

Specifically, FIG. 5A illustrates another example of generation of the movement plan. In one aspect, the server 304 may generate a graph 502 of a plurality of motorized tiles 0-17, where tile 15 is the blank tile, tile 0 is the destination tile, and target tile 17 is the target tile (to be moved to the destination tile 0). On the generation of the graph 502, the server 304 may determine a shortest path using Dijkstra's algorithm from the blank tile 15 to the target tile 17.

In response to determining of the shortest path, the server 304 may identify/select a smallest loop containing the blank tile 15, the destination tile 0, and the target tile 17. In this example, the server 304 may select the loop containing all the tiles 0-17 as the smallest loop.

In some aspects, the blank tile 15 may move in a direction as indicated by the arrow. For instance, the blank tile first moves to position of tile 16, and then to position of 17, and then to position of tile 12, and so on, in order to move the target tile to the position of the destination tile 0. In one aspect, the loop dynamically becomes small, based on the movement of the blank tile and the destination tile. For instance, in the present example, when the blank tile moves to the position of tile 1 or 4, and the target tile moves to the position of tile 16, then the server 304 may automatically reduce the size of the loop, as indicated in a graph 504. As and when the position of the blank tile and the target tile changes, the loop may become smaller and smaller, until the target tile moves to the location of the destination tile.

FIG. 5B illustrates another example of generation of the movement plan. In accordance with an embodiment, the server 304 may generate a graph 506 of a plurality of motorized tiles. The server 304 may identify the shortest path (indicated as the thick line in FIG. 5B) from a target tile 514 to a destination tile 516. Thereafter, the server 304 may move a blank tile 518 such that the target tile 514 moves along the shortest path. For instance, when the server 304 generates the graph 506, the server 304 may generate the movement plan such that the blank tile 518 moves in the direction indicated by arrows 1, 2, and 3, and causes the system to move the blank tile 518 below the target tile 514. This way, the target tile 514 can take the position of the blank tile 518, as indicated in a graph 508. Thereafter, the blank tile may move in the direction indicated by arrows 1, 2, and 3 in the graph 508, to take a position below the target tile so that the target tile can again replace the blank tile 518 and move in the designated shortest path to reach to the destination tile 516.

FIG. 5C illustrates another example for the generation of the movement plan. In accordance with an embodiment, the server 304 may generate a graph 510 of a plurality of motorized tiles. In this case, the server 304 may identify a "staircase path" as the shortest path (indicated as the thick line) from a target tile 520 to a destination tile 522. Thereafter, a blank tile 524 may move in such a way that the target tile 520 moves to the destination tile 522 through the staircase path. For instance, the blank tile 524 may move in the direction indicated by arrows 1 and 2 in the graph 510, so that the target tile 520 can replace the blank tile and move towards the right side, as indicated in a graph 512. Thereafter, the blank tile may move in the direction shown as arrows 1 and 2 in the graph 512, so that the target tile follows the designated staircase path to reach to the destination tile 522.

In accordance with an embodiment of the present disclosure, when there are multiple blank tiles in a graph, the server 304 may identify a blank tile that is closest to the target tile, to identify the shortest path. Thereafter, the server 304 may create the movement plan in the same manner as described above.

Figure 6A:
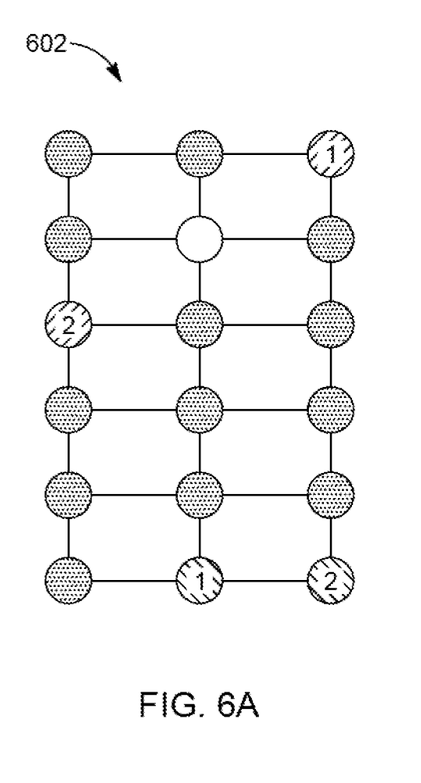
FIGS. 6A-6B depict different embodiments to move multiple containers to the respective destination locations in the delivery vehicle, in accordance with the present disclosure.
Figure 6B:
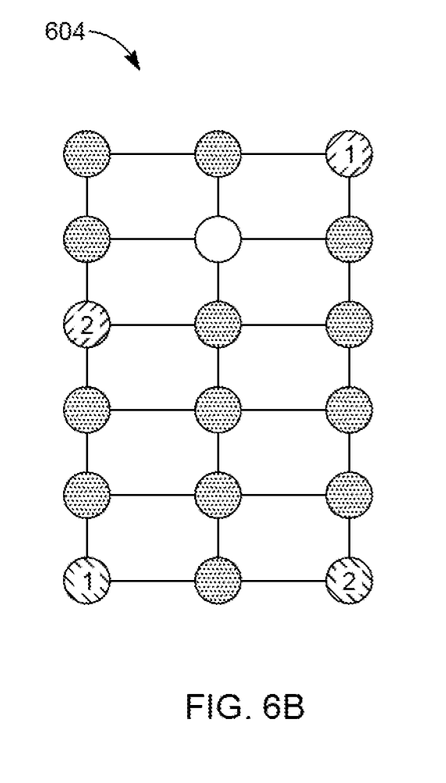

FIGS. 6A-6B depict different embodiments to move multiple target containers to the respective destination locations in the delivery vehicle 400, in accordance with the present disclosure. In some aspects, two or more packages placed in two or more containers may have the same delivery location, as per the delivery schedule. In this case, the containers containing these packages may have adjacent destination locations (e.g. near the exit of the delivery vehicle 400), or may have non-adjacent destination locations.

For instance, FIG. 6A depicts a first embodiment in which a graph 602 indicates a first target tile 1 and a second target tile 2 that are to be moved to the two destination locations (shown in the bottom row of the graph 602) that are adjacent. In this case, each of the first target tile 1 and the second target tile 2 may move consecutively, i.e. one after the other, using any of the methods described above, to reach to the respective destination locations. For example, the target tile 2 may move first from its current location to the destination location, and thereafter the target tile 1 may move from its current location to the destination location. In some aspects, the target tile 1 may move first to position the target tile 1 near to the target tile 2, and then both the target tile 1 and the target tile 2 move simultaneously to reach to the destination location.

FIG. 6B depicts a second embodiment, in which a graph 604 indicates a first target tile 1 and a second target tile 2 that are to be moved to two destination locations (shown in the bottom row of the graph 602) that are non-adjacent. In this case, the two target tiles may move simultaneously, so that each one reaches to its destination location.

Figure 7:
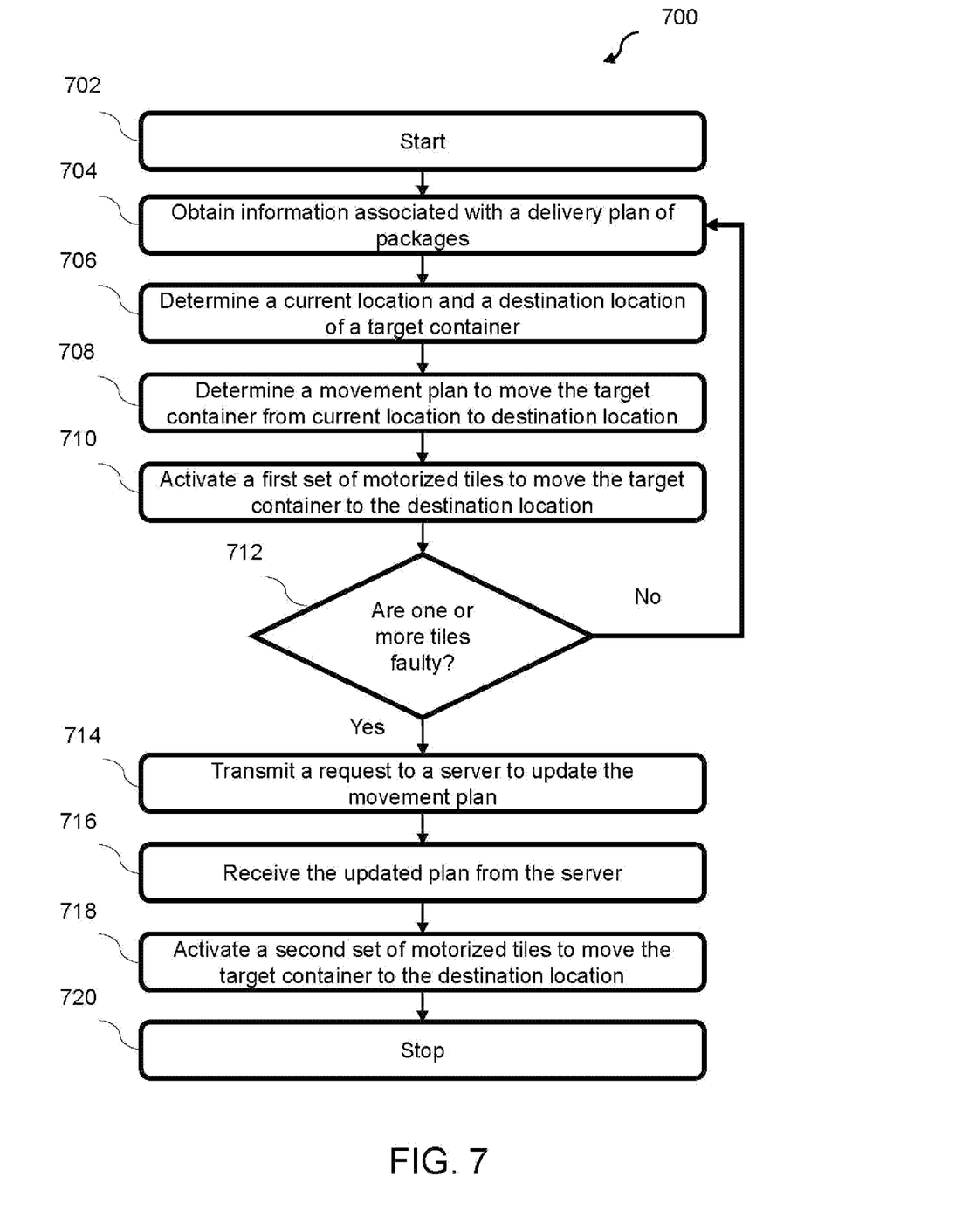
FIG. 7 depicts a flow diagram of an example method for facilitating delivery of packages, in accordance with the present disclosure.

FIG. 7 depicts a flow diagram of an example method for facilitating delivery of packages in accordance with the present disclosure. FIG. 7 may be described with continued reference to prior figures, including FIGS. 1-6. The following process is exemplary and not confined to the steps described hereafter. Moreover, alternative embodiments may include more or less steps that are shown or described herein and may include these steps in a different order than the order described in the following example embodiments.

Referring to FIG. 7, at step 702, the method 700 may commence. At step 704, the method 700 may include obtaining, via a processor of an on-board computer of a delivery vehicle, information associated with a delivery plan of packages. The information associated with the delivery plan may include a current delivery status for each package, a delivery schedule for each package, a mapping of the package with a container of the plurality of containers, and a mapping of the plurality of containers and a plurality of motorized tiles. The plurality of motorized tiles is placed in a grid in the delivery vehicle, and each tile is configured to move the container (containing the packages) placed on the tile, within the delivery vehicle.

At step 706, the method 700 may include determining, via the processor, a current location and a destination location of a target container, of the plurality of containers, based on the obtained information associated with the delivery plan of packages.

At step 708, the method 700 may include determining, via the processor, a movement plan to move the target container from its current location to the destination location. The movement plan may include sequence of steps to activate some or all of the plurality of motorized tiles on a path that offers the shortest distance between the current location of the target container and its destination location. In some aspects, the movement plan may be based on the least number of moves of the motorized tiles, required to move the target container from its current location to the destination location. In other aspects, the movement plan may be based on the least possible time to move the target container to the destination location.

In accordance with an embodiment, the determination of the movement plan may include receiving a pre-calculated movement pattern from the memory of the on-board computer. In some aspects, the movement plan may be generated by a server (for example, an external server) and transmitted to the on-board computer of the delivery vehicle, before the delivery vehicle commences the delivery of the packages, as described in conjunction with FIGS. 3-4.

At step 710, the method 700 includes activating, by the processor, a first set of motorized tiles of the plurality of motorized tiles, to move the target container to its destination location. In an embodiment, the processor activates the first set of motorized tiles, based on the pre-calculated movement patterns included in the determined movement plan.

The first set of motorized tiles, as mentioned above, may include a target motorized tile, a blank motorized tile, a destination motorized tile, and a set of additional motorized tiles. In some aspects, the target container is loaded on the target motorized tile, and the target container moves to the destination motorized tile based on the movement plan. In particular, the processor of the delivery vehicle may transmit an actuation signal to one or more actuators to actuate the first set of motorized tiles. The one or more actuators may actuate the respective tiles. The details of the activation of the first set of motorized tiles may be understood in conjunction with the figures described above.

At step 712, the method 700 may include determining, by the processor, if there is any fault in the first set of motorized tiles. This step of determination may be understood in conjunction with FIGS. 3-6.

Based on a determination that there is no fault, the method 700 moves back to the step 704.

On the other hand, based on a determination that there is a fault in one or more of the first set of motorized tiles, the method 700 moves to step 714. At step 714, the method 700 may include transmitting, via the processor, a request to a server to provide an updated movement plan. The updated movement play may be and/or include, for example, an updated movement pattern to move the target container to the destination location. The request may include a status of the first set of motorized tiles, the delivery status of each of the packages, and/or the like.

In response to the transmitted request, the server may transmit the updated movement plan to the processor. In some aspects, the updated movement plan may include a second set of motorized tiles to move the target container to the destination location, along with a pattern to activate the second set of motorized tiles. When the processor receives the updated movement plan at step 716, the processor may activate the second set of motorized tiles at step 718, to move the target container to the destination location. The method ends at step 720.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A delivery vehicle for delivering a plurality of packages, the delivery vehicle comprising:
 a grid of a plurality of motorized tiles configured to move a plurality of containers within the delivery vehicle, wherein the plurality of packages are placed in the plurality of containers;
 at least one memory that stores computer-executable instructions, wherein the at least one memory further stores one or more information associated with a delivery plan of the plurality of packages, and wherein the one or more information comprises:
 for each package of the plurality of packages:
  a current delivery status,
  a delivery schedule,
  a mapping of the package with a container of the plurality of containers, and
 a mapping of the plurality of containers and the plurality of motorized tiles; and
 at least one processor configured to access the at least one memory and execute the computer-executable instructions to at least:
 obtain the one or more information from the at least one memory;
 based on the one or more information, determine a current location and a destination location of a target container, of the plurality of containers, within the grid;
 determine a movement plan to move the target container from the current location to the destination location;
 activate a first set of motorized tiles, of the plurality of motorized tiles, to move the target container to the destination location based on the movement plan;
 transmit a request to a server to update the movement plan when a preset condition is met;
 receive an updated movement plan from the server, in response to the transmitted request; and
 activate a second set of motorized tiles, of the plurality of motorized tiles, to move the target container to the destination location based on the updated movement plan.

2. The delivery vehicle of claim 1, wherein the plurality of packages are placed in the plurality of containers based on the delivery schedule of each of the plurality of packages, and a size and a weight of each package of the plurality of packages.

3. The delivery vehicle of claim 1, wherein the plurality of containers are loaded on the grid of the plurality of motorized tiles based on the delivery schedule of each of the plurality of packages.

4. The delivery vehicle of claim 1, wherein the processor determines the movement plan by receiving a pre-calculated movement pattern from the at least one memory, and wherein the pre-calculated movement pattern comprises instructions to activate the first set of motorized tiles such that the target container moves to the destination location in a least possible number of moves of the first set of motorized tiles.

5. The delivery vehicle of claim 1, wherein the processor determines the movement plan by receiving a pre-calculated movement pattern from the at least one memory, and wherein the pre-calculated movement pattern comprises instructions to activate the first set of motorized tiles such that the target container moves to the destination location in a least possible time.

6. The delivery vehicle of claim 1, wherein the preset condition is met when one or more motorized tiles of the first set of motorized tiles cease to function.

7. The delivery vehicle of claim 1, wherein the first set of motorized tiles comprises a target motorized tile, a blank motorized tile, a destination motorized tile, and a third set of motorized tiles, wherein the target container is loaded on the target motorized tile, and wherein the target container is to be moved to the destination motorized tile based on the movement plan.

8. The delivery vehicle of claim 7, wherein the second set of motorized tiles comprises the target motorized tile, the blank motorized tile, the destination motorized tile, one or more motorized tiles of the third set of motorized tiles, and a fourth set of motorized tiles that are located adjacent to the first set of motorized tiles.

9. A method for delivering a plurality of packages, the method comprising:
 obtaining, via a processor, one or more information associated with a delivery plan of the plurality of packages from at least one memory, wherein the one or more information comprises:
 for each package of the plurality of packages:
  a current delivery status,
  a delivery schedule,
  a mapping of the package with a container of a plurality of containers, wherein the plurality of packages are placed in the plurality of containers, and
 a mapping of the plurality of containers and a plurality of motorized tiles, wherein the plurality of motorized tiles are placed in a grid, in a delivery vehicle, and are configured to move the plurality of containers within the delivery vehicle;
 based on the one or more information, determining, via the processor, a current location and a destination location of a target container, of the plurality of containers, within the grid;
 in response to the determination of the current location and the destination location, determining, via the processor, a movement plan to move the target container from the current location to the destination location;
 activating, via the processor, a first set of motorized tiles, of the plurality of motorized tiles, to move the target container to the destination location based on the movement plan;
 transmitting, via the processor, a request to a server to update the movement plan when a preset condition is met;

receiving, via the processor, an updated movement plan from the server, in response to the transmitted request; and activating, via the processor, a second set of motorized tiles, of the plurality of motorized tiles, to move the target container to the destination location based on the updated movement plan.

10. The method of claim 9, wherein the plurality of packages are placed in the plurality of containers based on the delivery schedule of each of the plurality of packages, and a size and a weight of each package of the plurality of packages.

11. The method of claim 9, wherein the plurality of containers are loaded on the grid of the plurality of motorized tiles based on the delivery schedule of each of the plurality of packages.

12. The method of claim 9, wherein determining the movement plan comprises receiving a pre-calculated movement pattern from the at least one memory, and wherein the pre-calculated movement pattern comprises instructions to activate the first set of motorized tiles such that the target container moves to the destination location in a least possible number of moves of the first set of motorized tiles.

13. The method of claim 9, wherein determining the movement plan comprises receiving a pre-calculated movement pattern from the at least one memory, and wherein the pre-calculated movement pattern comprises instructions to activate the first set of motorized tiles such that the target container moves to the destination location in a least possible time.

14. The method of claim 9, wherein the preset condition is met when one or more motorized tiles of the first set of motorized tiles cease to function.

15. The method of claim 9, wherein the first set of motorized tiles comprises a target motorized tile, a blank motorized tile, a destination motorized tile, and a third set of motorized tiles, wherein the target container is loaded on the target motorized tile, and wherein the target container is to be moved to the destination motorized tile based on the movement plan.

16. The method of claim 15, wherein the second set of motorized tiles comprises the target motorized tile, the blank motorized tile, the destination motorized tile, one or more motorized tiles of the third set of motorized tiles, and a fourth set of motorized tiles that are located adjacent to the first set of motorized tiles.

17. A non-transitory computer-readable storage medium in a distributed computing system, the non-transitory computer-readable storage medium having instructions stored thereupon which, when executed by a processor, cause the processor to:

obtain one or more information associated with a delivery plan of a plurality of packages, wherein the one or more information comprises:
for each package of the plurality of packages:
a current delivery status,
a delivery schedule,
a mapping of the package with a container of a plurality of containers, wherein the plurality of packages are placed in the plurality of containers, and
a mapping of the plurality of containers and a plurality of motorized tiles, wherein the plurality of motorized tiles are placed in a grid, in a delivery vehicle, and are configured to move the plurality of containers within the delivery vehicle;
based on the one or more information, determine a current location and a destination location of a target container, of the plurality of containers, within the grid;
determine a movement plan to move the target container from the current location to the destination location;
activate a first set of motorized tiles, of the plurality of motorized tiles, to move the target container to the destination location based on the movement plan;
transmit a request to a server to update the movement plan when a preset condition is met;
receive an updated movement plan from the server, in response to the transmitted request; and
activate a second set of motorized tiles, of the plurality of motorized tiles, to move the target container to the destination location based on the updated movement plan.

18. A system to facilitate delivery of a plurality of packages by a delivery vehicle, the system comprising:
at least one memory that stores computer-executable instructions, wherein the at least one memory further stores one or more information associated with a delivery plan of the plurality of packages, wherein the one or more information comprises:
for each package of the plurality of packages:
a delivery schedule,
a mapping of the package with a container of a plurality of containers, wherein the plurality of packages are placed in the plurality of containers,
a movement plan to move a target container, of the plurality of containers, from a current location to a destination location in the delivery vehicle, and
a mapping of the plurality of containers and a plurality of motorized tiles placed in a grid, in the delivery vehicle, wherein the plurality of motorized tiles are configured to move the plurality of containers within the delivery vehicle, and
wherein the movement plan comprises a movement pattern of a first set of motorized tiles, of the plurality of motorized tiles, to move the target container to the destination location; and
at least one processor configured to access the at least one memory and execute the computer-executable instructions to at least:
receive a request from the delivery vehicle to update the movement plan to move the target container from the current location to the destination location, wherein the request comprises a status of the first set of motorized tiles, and wherein the request is received when one or more motorized tiles, of the first set of motorized tiles, cease to function;
in response to receipt of the request, determine an updated movement plan based on the one or more information and the status of the first set of motorized tiles, wherein the updated movement plan comprises a movement pattern of a second set of motorized tiles, of the plurality of motorized tiles, to move the target container to the destination location; and
transmit the updated movement plan to the delivery vehicle.

* * * * *